Figure 1:
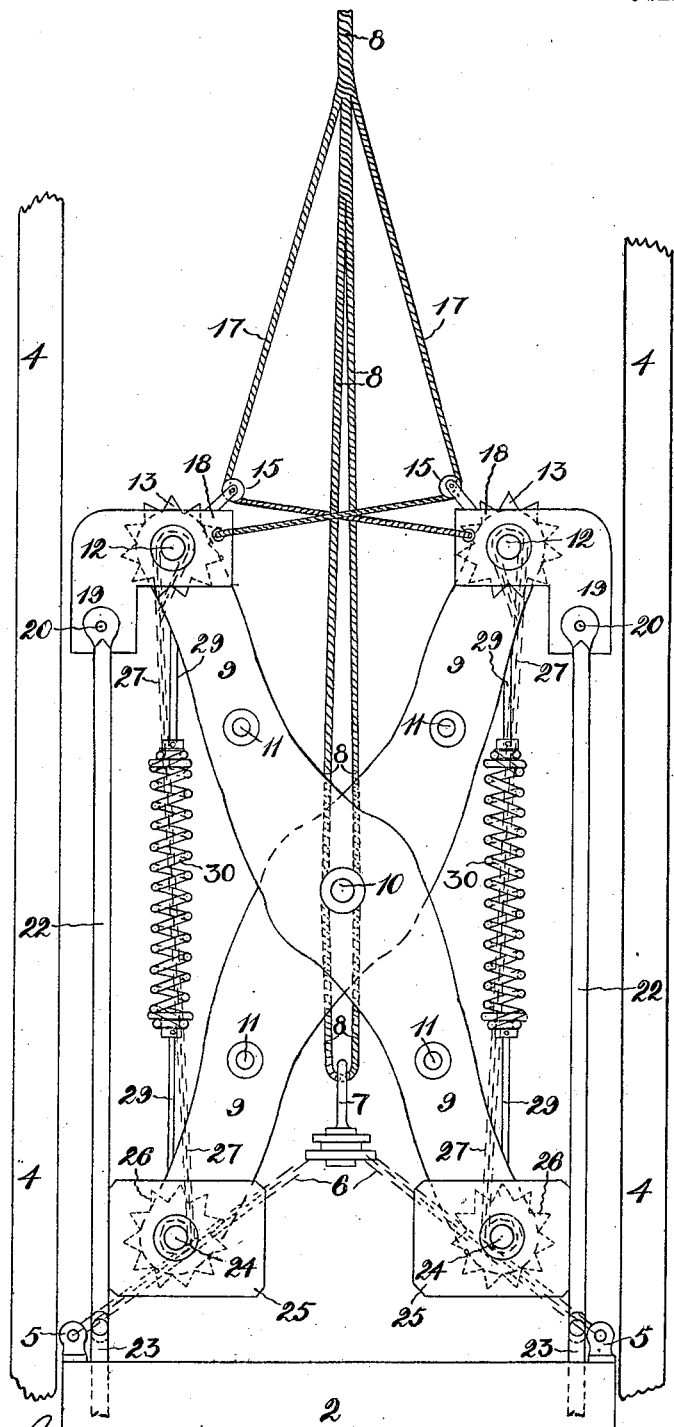

No. 887,264. PATENTED MAY 12, 1908.
A. M. NEWMAN.
SAFETY BRAKE MECHANISM FOR MINE CAGES, SKIPS, AND LIFTS.
APPLICATION FILED APR. 16, 1907.

5 SHEETS—SHEET 1.

No. 887,264. PATENTED MAY 12, 1908.
A. M. NEWMAN.
SAFETY BRAKE MECHANISM FOR MINE CAGES, SKIPS, AND LIFTS.
APPLICATION FILED APR. 16, 1907.

5 SHEETS—SHEET 2.

Witnesses:

Inventor: Alfred Morley Newman
by Chas. Ovendale
Attorney

No. 887,264. PATENTED MAY 12, 1908.
A. M. NEWMAN.
SAFETY BRAKE MECHANISM FOR MINE CAGES, SKIPS, AND LIFTS.
APPLICATION FILED APR. 16, 1907.

5 SHEETS—SHEET 3.

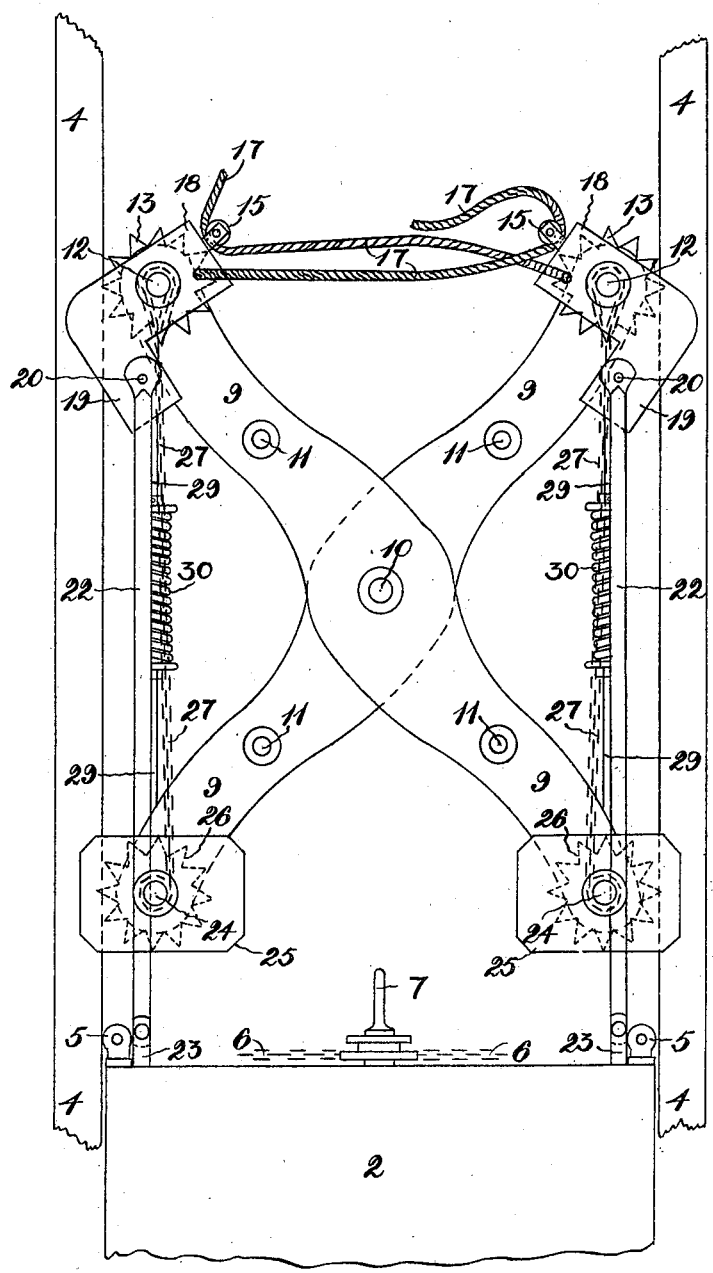

UNITED STATES PATENT OFFICE.

ALFRED MORLEY NEWMAN, OF JOHANNESBURG, TRANSVAAL, ASSIGNOR OF ONE-HALF TO LOUIS ALLEN LEVEY, OF MARAISBURG, TRANSVAAL.

SAFETY BRAKE MECHANISM FOR MINE CAGES, SKIPS, AND LIFTS.

No. 887,264.  Specification of Letters Patent.  Patented May 12, 1908.

Application filed April 16, 1907. Serial No. 368,589.

*To all whom it may concern:*

Be it known that I, ALFRED MORLEY NEWMAN, a subject of the King of Great Britain, and resident of Johannesburg, Transvaal, have invented certain new and useful Improvements in Safety Brake Mechanism for Mine Cages and Skips, Lifts, and the Like, of which the following is a specification.

This invention relates to safety mechanism primarily designed for use with the cages, skips or similar vehicles employed in mine shafts. It may be also adapted for lifts, hoists, elevators or other like hoisting apparatus.

The object of the invention is to provide mechanism which may be relied upon under all ordinary circumstances to retard and ultimately arrest the movement of the cage, skip, car or other vehicle without serious injury to the shaft timbers and without transmitting violent shocks to the occupants of the vehicle.

In accordance with the invention I provide timbers which are arranged parallel with and at both sides of the runners on the two opposite sides of the shaft.

Located on the top of the vehicle and at each of two opposite sides is a pair of pivoted levers. These levers at their extremities on the one side, are connected with the levers on the opposite side by means of four shafts or spindles. On the ends of the two upper shafts or spindles on the inside of the levers, are loosely mounted four toothed wheels which are adapted when the safety catch comes into operation, to engage the timbers arranged parallel with the runners.

The two shafts carried at the lower extremities of the levers have fixed thereon on the inside of the levers, four similar toothed wheels which are also adapted to engage the timbers arranged parallel with the runners, when the safety mechanism comes into operation. The two upper shafts are connected by means of ropes, chains or their equivalent, with the two lower shafts. These ropes or chains are loosely connected with the top shafts and are fixed to the bottom shafts so that when the latter are rotated through the toothed wheels fixed thereon, they serve to wind the chain onto the shaft and so draw the shafts toward each other and expand the levers, which force the toothed wheels the more tightly into engagement with the timbers. The winding or hauling rope is connected by means of shackle and chains with the vehicle in the ordinary or other suitable manner.

On the extremities of the two top shafts are arranged plates which are adapted to rotate on the shafts. These plates serve as guides to insure the toothed wheels engaging the timbers in the event of the safety mechanism coming into operation. To each of these plates are attached ropes, chains or the like, which pass round guide pulleys preferably carried by the shafts, which ropes are connected to the winding or hauling rope. The connections between the ropes and plate serve to draw the extremities of the levers together to place the safety mechanism out of operation in the normal running of the vehicle or when the weight of the latter is being carried by the winding rope.

To each of the four plates carried by the two top shafts is pivotally connected a vertically disposed rod or bar which is hinged or pivoted to another rod or bar. These latter four rods or bars are preferably located in the four corners of the vehicle and extend the full length and project for a suitable distance beneath the bottom of the cage. Surrounding these latter rods is a suitable number of coiled springs and on the rods are fixed collars, between which and plates or brackets fixed to the vehicle, the springs are placed in compression when the weight of the vehicle is carried by the winding rope.

The extremities of the four rods below the bottom of the cage are engaged by bow springs and between the extremities of these springs and the bottom of the cage, coiled springs are preferably located. The several springs operating in conjunction with the four vertical rods at the corners of the vehicle, operate as buffer springs in the event of breakage of the winding rope or in the event of breakage of the suspension gear, to prevent the transmission of injurious shocks to the occupants of the vehicle. The extremities of the two lower shafts carried by the levers also preferably carry plates which engage the timbers and serve as guides to insure the bottom toothed wheels engaging said timbers. The two top shafts are further connected with the two bottom shafts by means of ropes, chains or cords and springs, which latter are placed in tension in the normal running of the vehicle so that they operate in the event of the vehicle becoming unsupported in the shaft, to extend the levers to cause the toothed wheels to come into contact with the timbers and so bring the mechanism into operation.

In order that the invention may be more easily understood I append five sheets of illustrative drawings, marked with numerals corresponding to the following description thereof.

Figure 2:
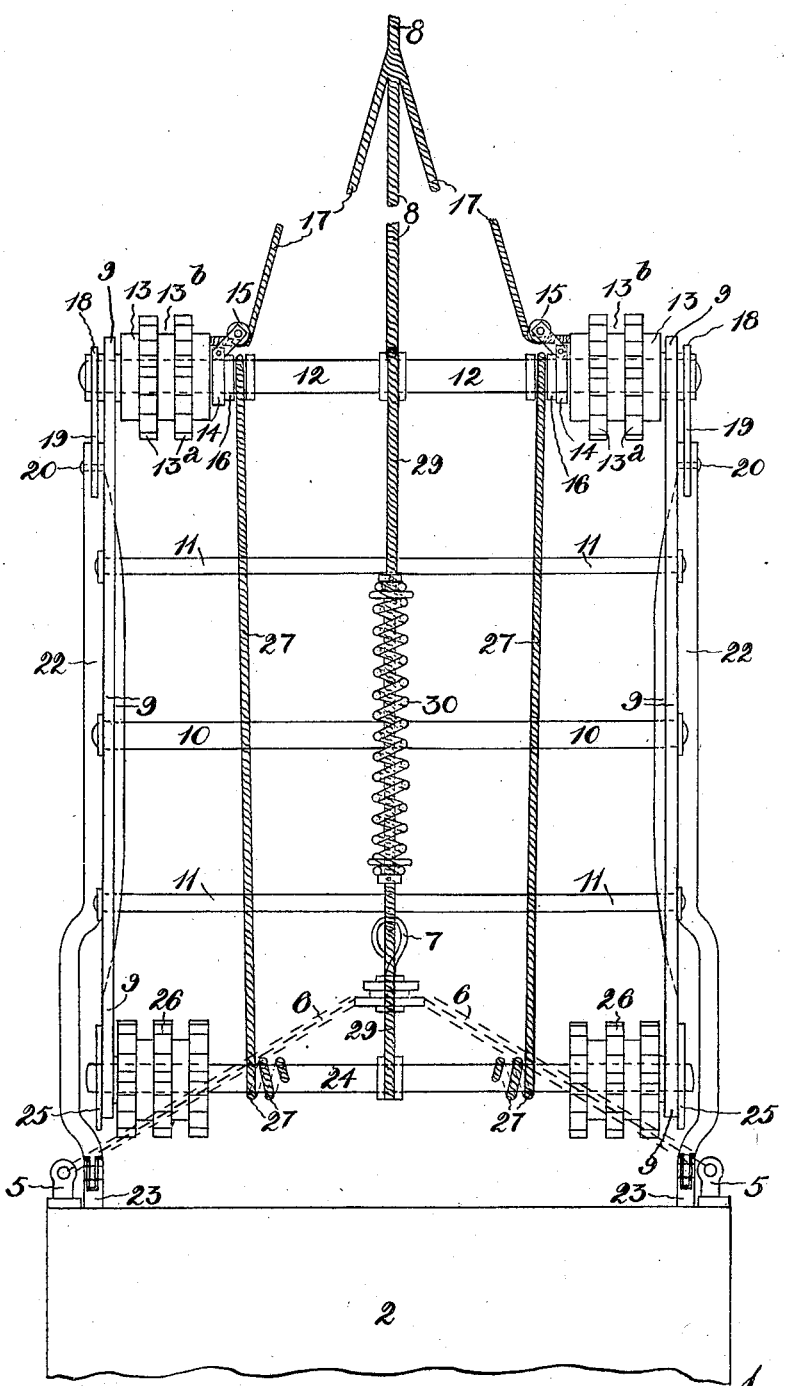
Figure 3:
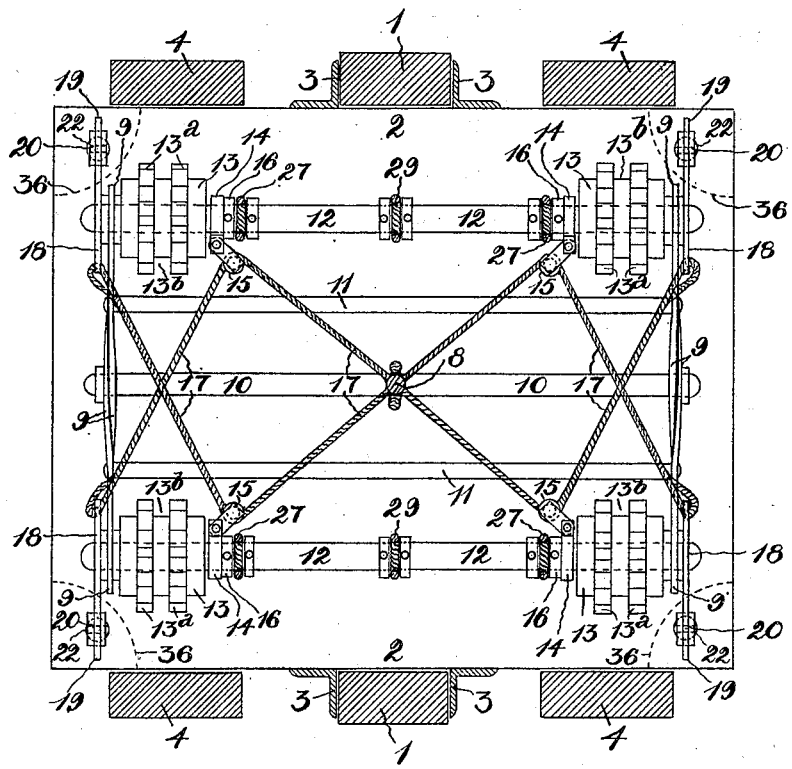
Figure 4:
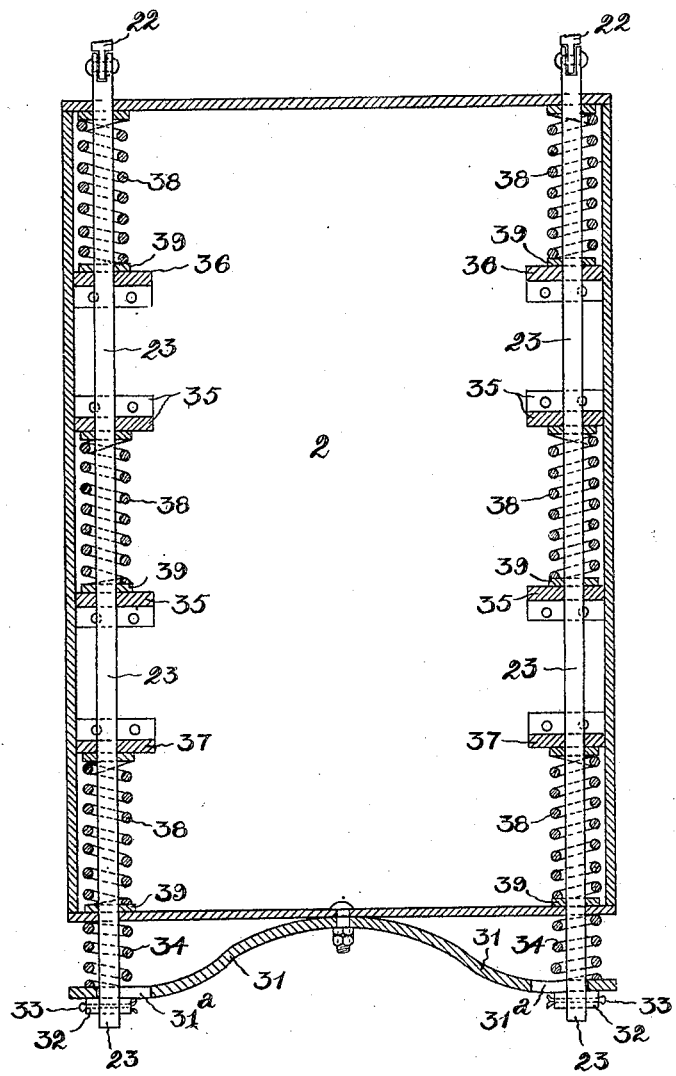

In the drawings, Figure 1 represents a side elevation of the upper portion of a cage or vehicle with the safety mechanism arranged thereon. Fig. 2 is an elevation at right angles to Fig. 1. Fig. 3 is a plan of the structure shown in Fig. 2. Fig. 4 is a vertical section taken through the vehicle showing the arrangement of buffer springs. Fig. 5 is an elevation similar to Fig. 1 showing the several parts of the mechanism in the positions they assume in the event of the breakage of the hauling rope, to support the cage or vehicle in the shaft.

1 designates the runners or skids ordinarily provided in a mine shaft for guiding the cages, skips or other vehicles in their ascent and descent.

2 represents the cage, which as shown is equipped with the angle iron shoes or slippers 3 adapted to slidingly engage the runners or skids 1 to guide the vehicle. Preferably on those sides of the shaft which are equipped with the skids or runners 1, I provide at both sides of said runners or skids, vertically disposed wooden beams or timbers 4, which are continuous or are provided from the top to the bottom of the shaft. On the top of the cage 2 at the four corners are provided the eyepieces 5 with which are connected the chains 6 and shackle 7.

8 is the winding rope, which as shown in Fig. 1, engages the shackle 7 and so carries the weight of the cage 2 through the chains 6. The lower end of the winding rope 8 as shown in Fig. 1 is looped or otherwise similarly constructed.

9 are two pairs of pivoted levers. The two pairs of pivoted levers 9 are pivoted about their centers on the horizontal rod or bolt 10. The two parts of the looped portion of the winding rope 8 pass down opposire sides of the rod or bolt 10 as shown in Figs. 1 and 3. The two pairs of levers 9 are also connected by the four horizontal bolts or rods 11, said bolts serving as stays to render the levers 9 more rigid and also to insure their being operated simultaneously. The extremities of the upper arms of the levers 9 are connected by the two horizontally arranged shafts 12. On the ends of these shafts 12, inside the levers 9, are revolubly mounted the four toothed wheels 13 which are adapted when the levers are expanded, to come into contact with the front faces of the timbers 4, see Fig. 3. The toothed wheels 13 may be constructed as shown with the two parts 13ᵃ formed with the teeth and the annular space or groove 13ᵇ between them. Although this construction is preferred as it minimizes the possibility of the teeth getting filled up with the wood of the timbers 4, it will be apparent that any other suitable construction may be adopted.

14 are loose collars and 15 pulleys swiveled to said collars 14. The loose collars 14 are retained in position on the shafts 12 by means of fixed collars 16.

17 represent four wire or other suitable flexible ropes, chains, or the like, which at one end are spliced into or otherwise connected with the main hoisting rope 8. Each of these ropes 17 passes around one of the pulleys 15 and is attached as shown to the inner end of a plate 18 revolubly mounted on the extremities of the two shafts 12 outside the levers 9. These plates 18 assume the position in which they are shown in Fig. 1 when the weight of the cage is carried by the hoisting rope 8. In the event of the cage becoming unsupported they assume the position shown in Fig. 5 and project to the outside of the timbers 4 and so serve as guides to maintain the toothed wheels 13 in contact with the timbers 4. The downwardly extending portions 19 of the plates 18 are formed with holes which are connected by pins or bolts 20 passing through the flattened and bifurcated upper extremities of the vertically disposed rods 22. To the lower extremities of the rods 22 are pivotally connected other rods 23 which extend the full length of the cage and project for a suitable distance below the bottom as shown in connection with Fig. 4. These latter rods 23 form part of the buffer gear to be hereinafter explained.

The lower arms of the two pairs of pivoted levers 9 carry two other horizontally disposed shafts 24. These shafts are revoluble in their bearings in the ends of the levers. 25 are plates fixed to the levers 9 and loosely fitting the ends of the shafts 24, which serve as guides by engaging the timbers 4 when the levers are extended, in the same manner as previously described in connection with the plates 18. On the shafts 24 next the levers 9 are keyed or otherwise suitably fixed toothed wheels 26 which are also adapted to contact with the timbers 4 when the levers are extended. These toothed wheels 26 may as shown in Fig. 2 be constructed with the three toothed portions between which are provided the annular grooves or recesses for the purpose previously described in connection with the toothed wheels 13. When the toothed wheels 26 engage the timbers they rotate the two shafts 24.

27 are two chains, or wire or other suitable ropes which loosely embrace the upper shafts 12 and are coiled round and attached to the lower shafts 24, see Fig. 3. These chains or ropes 27 operate when the mechanism comes into operation to draw the upper and lower shafts 12, 24, respectively, towards each other and so move the arms of the levers 9 in an outward direction which gradually press the toothed wheels 13, 26, with greater force into contact with the timbers 4, and so arrest the movement of the vehicle. When the toothed wheels 26 engage the timbers 4 the shafts 24 are rotated and the chains or ropes 27 are coiled round the shafts 24, which action draws the top and bottom shafts 12, 24, in the direction of each other. Each of the shafts 12 is also connected with the shaft 24 beneath it, by means of rods, ropes or chains 29 which loosely encircle the shafts 12, 24, the inner extremities of which rods, ropes or chains 29 are connected through the medium of a coiled spring 30. The latter springs 30, which in the normal running of the cage are placed in tension, serve when the cage becomes unsupported through breakage of the winding rope or otherwise, to draw the shafts 12, 24, together sufficiently far to cause the toothed wheels 13, 26 to come into contact with the timbers.

The arrangement of buffer springs which operate to prevent the transmission of injurious shocks to the occupants of the cage is illustrated in Fig. 4. The four rods 23 which at their upper extremities are pivotally connected to the rods 22, pass through the four corners and extend for a suitable distance below the bottom of the cage. To the underside of the cage are fixed two bow springs 31 in the extremities of which are formed slots 31ª for the rods 23. These slots 31ª permit the bow springs 31 to expand outwardly or to flatten.

32 are collars secured by pins 33 to the extremities of the rods 23 below the springs 31. Between the bow springs 31 and the bottom of the cage 2 and encircling the rods 23 are coiled springs 34. In the corners of the cage are fixed a suitable number of plates 35, 36, 37, bolted through flanges to the sides of the cage. The rods 23 pass through holes in these several plates 35, 36 37. Between the top of the cage 2 and the top plate 36 and between the two intermediate plates 35, and between the bottom plate 37 and the inside of the bottom of the cage 2, and encircling the rods 23, are coiled springs 38. On the rods 23 are fixed collars 39. The upper ends of the several springs 34, 38, are preferably made flat to form a bearing surface to engage the underside of the several plates. In the normal running of the cage the several springs 34, 38, are fully distended. In the event of the breakage of the rope 8 the shock which might otherwise be transmitted to the occupants of the cage is absorbed by the springs 34, 38, the cage being capable of sufficient movement for this purpose down the rods 23.

The operation of the mechanism may be described as follows: Figs. 1, 2 and 3 illustrate the mechanism in its normal position or when the weight of the cage is carried by the winding rope 8. In this position the weight of the cage 2 is directly transmitted through the chains 6 and rope shackle 7 to the hauling rope 8, the ropes 17 are placed in tension and draw inwards or towards each other the upper extremities of the four levers 9. The toothed wheels 13, 26, all run clear of the timbers 4 and the springs 30 are in tension. On the breakage of the rope 8 the tension in the ropes 17 is relaxed, which allows the springs 30 to draw the two top and two bottom shafts 12, 24, respectively, towards each other. This movement distends the arms of the levers 9 or places them in the position in which they are illustrated in Fig. 5. When in this position the guide plates 18, 25, project to the sides of the timbers 4 and the toothed wheels 13, 26, come into contact with the front faces of said timbers 4. As the cage continues to fall the toothed wheels 26 on the two bottom shafts 24 rotate said shafts and so wind the ropes or chains 27 on to them. This action gradually draws the top and bottom shafts 12, 24, together, further distends the levers 9 and throws the toothed wheels 13, 26, further into contact with the timbers 4. This action continues with gradually increasing resistance to the downward movement of the vehicle until the latter is brought to rest. When the toothed wheels 13, 26, first contact with the timbers 4, the descent of the cage 2 is checked and the shock thereby produced is absorbed, as previously described, by the springs 31, 34, 38.

By raising the hoisting or winding rope 8, and if necessary previously making the connection between it and the ropes 17, the placing in tension of the winding rope 8 and ropes 17 draws the several parts of the mechanism back into their inoperative positions.

What I claim as my invention and desire to protect by Letters Patent is:—

1. In apparatus of the nature specified, the combination with the vehicle of two pairs of levers pivoted at the center and located at opposite sides of the vehicle, shafts carried by and between the extremities of said two pairs of levers, wheels mounted on said shafts, timbers with which the wheels are adapted to contact to arrest the movement of the vehicle on the breakage of the suspension gear, means for expanding said levers to cause the wheels to engage the timbers, and means operated by the wheels to further expand the levers to bring the vehicle to rest.

2. In apparatus of the nature specified, the combination with the vehicle of two pairs of levers located at opposite sides of the vehicle, a rod or shaft between the two pairs of levers forming the pivot therefor, upper shafts carried by and between the upper extremities of the two pairs of levers, timbers, toothed wheels on the upper shafts adapted to contact with the timbers on the breakage of the suspension gear, lower shafts carried by and between the other extremities of the levers, toothed wheels fixed on said latter shafts and adapted to contact with the timbers aforesaid, spring media connecting the upper shafts with the lower shafts for expanding the levers to cause the toothed wheels to engage the timbers on the breakage of the suspension gear, and means operated by the lower shafts and wheels to further expand the levers.

3. In apparatus of the nature specified, the combination with the vehicle of two pairs of pivoted levers located at opposite sides of the vehicle, connections between said levers and the winding rope which operate to draw the levers together when the weight of the vehicle is on the winding rope, shafts carried by and between the extremities of the two pairs of levers, wheels mounted on said shafts, timbers with which said wheels are adapted to contact when the tension in the winding rope is relaxed, springs connecting the shafts in pairs which springs operate to expand the levers on the breakage of the suspension gear to cause the wheels to contact with the timbers, and flexible connections between the shafts which operate to further expand the levers to arrest the movement of the falling vehicle, as set forth.

4. In apparatus of the nature specified, the combination with the vehicle of two pairs of pivoted levers located at opposite sides of the vehicle, connections between said levers and the winding rope, upper and lower shafts carried by and between the extremities of the two pairs of levers, toothed wheels mounted on said shafts, timbers with which said wheels are adapted to contact when the tension in the winding rope is relaxed, springs connecting the shafts in pairs which springs operate to expand the levers on the breakage of the suspension gear to cause the wheels to contact with the timbers, and flexible connections loosely connected with the upper shafts and fixed to the lower shafts to further expand the levers to arrest the movement of the vehicle, as set forth.

5. In apparatus of the nature specified, the combination with the vehicle of the four levers arranged in pairs at opposite sides of the vehicle, a centrally disposed rod positioned between the levers and forming the pivot therefor, a pair of upper shafts carried by and between the upper extremities of said levers, toothed wheels revolubly mounted on said shafts, timbers, which said wheels are adapted to engage, a pair of shafts carried by and between the other extremities of the levers, toothed wheels fixed thereto adapted to contact with the timbers aforesaid, guide plates revolubly positioned on the outer extremities of the upper shafts, flexible connections between said plates and the hoisting rope, a rod pivoted to each guide plate, a second rod pivoted to each of said rods, springs operating in conjunction with said second rods to prevent the transmission of shocks to the occupants of the vehicle, and springs connecting the shafts in pairs which operate to expand the levers on the breakage of the suspension gear to cause the wheels to contact with the timbers, as set forth.

6. In apparatus of the nature specified, the combination with the vehicle of two pairs of levers, located at opposite sides of the vehicle, a central rod forming a pivot for both pairs of levers, upper and lower shafts connecting the extremities of the opposite arms of each pair of levers, toothed wheels mounted on said shafts, timbers which said toothed wheels may engage, plates revolubly mounted on the extremities of the upper shafts, flexible connections between said plates and the winding rope, a rod pivoted to each of said plates, a second rod pivoted to each of the aforementioned rods, said second rods projecting down through the corners of the vehicle, plates fixed to the vehicle through which said second rods extend, collars fixed on the latter rods and springs between the rods and plates, bow springs located beneath the cage working in conjunction with the second rods and springs, to prevent the transmission of injurious shocks to the occupants of the vehicle when the safety mechanism comes into operation, and spring media connecting the two pairs of shafts for expanding the levers to cause the toothed wheels to engage the timbers in the shaft on the breakage of the suspension gear, as set forth.

7. In apparatus of the nature specified, the combination with the vehicle of two pairs of levers, located at opposite sides of the vehicle, a central rod forming a pivot for both pairs of levers, upper and lower shafts connecting the extremities of the opposite arms of the two pairs of levers, toothed wheels mounted on said shafts, timbers with which said toothed wheels may engage, springs connecting the shafts in pairs for expanding the levers on the breakage of the suspension gear to cause the toothed wheels to engage the timbers, flexible connections between the shafts which operate to further expand the levers, plates on the extremities of the upper shafts, flexible connections between said plates and the winding rope, a rod pivoted to each of said plates a second rod pivoted to each of the aforementioned rods, said second rods extending to the underside of the vehicle, plates fixed to the vehicle through which said second rods project, collars fixed on the latter rods and springs between the rods and plates, and bow springs located beneath the cage working in conjunction with the second rods and springs, to prevent the transmission of injurious shocks to the occupants of the vehicle when the safety mechanism comes into operation, as set forth.

In witness whereof I have hereunto set my hand in the presence of two subscribing witnesses.

ALFRED MORLEY NEWMAN.

Witnesses:
CHAS. OVENDALE,
R. OVENDALE.